United States Patent Office  
3,709,881  
Patented Jan. 9, 1973

3,709,881
PREPARATION OF N-ALKYLMORPHOLINES FROM DIETHYLENE GLYCOL AND ALKYLAMINES
Glenn H. Warner, St. Albans, W. Va., assignor to Union Carbide Corporation
No Drawing. Continuation of application Ser. No. 669,367, Sept. 21, 1967. This application Feb. 19, 1971, Ser. No. 117,061
Int. Cl. C07d 87/24, 87/26
U.S. Cl. 260—247          18 Claims

ABSTRACT OF THE DISCLOSURE

The disclosure describes the preparation N-alkyl-morpholines by the reaction of diethylene glycol and an alkyl, dialkyl or trialkylamine in the presence of a hydrogenation catalyst. In the preferred embodiments the reaction is conducted in the presence of hydrogen, at elevated temperatures and pressures in the presence of water.

The examples specifically disclose the reaction of diethylene glycol and diethylamine, ethylamine, triethylamine, and dimethylamine, at about 250° C. and up to about 1500 p.s.i.g. in the presence of hydrogen and a nickel hydrogenation catalyst supported on an inert carrier for the production of N-methyl-morpholine and N-ethylmorpholine.

---

This application is a continuation of my copending application Ser. No. 669,367, filed Sept. 21, 1967, now abandoned.

The present invention relates to a method for the manufacture of N-alkylmorpholine by the reaction of diethylene glycol and an alkylamie, such as the monoalkylamines, dialkylamines and trialkylamines.

The method of the present invention represents an improvement over the prior art in that alkylamines, dialkylamines, or trialkylamines and diethylene glycol are relatively inexpensive and readily available commercial materials. Conversion of these components to a N-alkylmorpholine in yields above about 60% by a single reaction step is possible in several instances and thus represents an economical method for the manufacture of the N-substituted morpholines. Furthermore, the reaction of diethylene glycol and the alkylamines produce N-alkylmorpholines directly. This avoids the formation of the intermediate salts of the amine as is the case in reacting sulfuric acid with N-alkylidethanolamines or in the "Chlorex" reaction in which di(2-chloroethyl)ether is reacted with a mononalkylamine, both of which reactions require the neutralization of the amine salt by caustic e.g. NaOH. In the reaction according to the present invention neutralization of the reaction mixture by caustic is not required and the formation of inorganic salts is avoided. Because the reaction of diethylene glycol with alkylamines results in the direct production of N-alkylmorpholine which can be distilled from the reaction mixture without prior treatment, the process does not result in the production of inorganic by-products and as a consequence there are no waste disposal problems and the isolation of the N-alkylmorpholine is simplified.

The alkylamines used to react with diethylene glycol to form the N-alkylmorpholine compounds generally may be described as those compounds having the formula:

$$R_1R_2R_3N$$

wherein $R_1$, $R_2$, $R_3$ are members of the group consisting of hydrogen or a 1 to about 5 carbon atom alkyl. Accordingly it is intended that the term "alkylamine" as used throughout the present specification and claims include the monoalkylamines, dialkylamines and the trialkylamines where the alkyl moieties have from 1 to about 5 carbon atoms. Some amines that may be used for the purpose of this invention comprise ethylamine, diethylamine, triethylamine, methylamine, dimethylamine, trimethylamine, isopropylamine, propylamine, n-butylamine, isobutylamine, n-amylamine, isoamylamine, and the like.

The rate of reaction of the trialkylamines, is much lower than either the mono or the dialkylamines because mixtures of products would result from their use and consequently the trialkylamines tend to produce lower yields of N-alkylmorpholines over a given period of time. On the other hand, the reaction of monoalkylamines with the diethylene glycol results in the production of a larger amount of high boiling residue then does the similar reaction with a dialkylamine. Accordingly, the dialkylamines are the preferred alkylamines.

The interaction of the alkylamine with itself and with intermediates formed during the reaction, tends to reduce the amount of N-alkylmorpholine produced. Consequently, it is preferred to use an amine glycol mole ratio of about 1.5–2.01 to about 1 to obtain maximum yields of N-alkylmorpholine. Amine glycol mole ratios greater than about 2:1 may also be employed but offer no economic advantage. Thus in its broadest aspect the mole ratio of amine glycol may vary anywhere from about 1 to about 10:1.

In another aspect of this invention it has been discovered that the addition of water to the reaction of ethylene glycol and the aforementioned alkylamines, increases the yield of N-alkylmorpholines. This has been found to be especially the case in the reaction of diethylene glycol and diethylamine for the production of N-ethylmorpholine. Thus, anywhere from 0 to about 100 parts by weight of water may be used for every 475 parts by weight of diethylene glycol used for the reaction with the alkylamines.

The reaction of diethylene glycol and the alkylamines may be conducted over a temperature range from about 200 to about 275° C., preferably from about 225 to about 250° C. Reaction temperatures lower than 200° C. result in a prolonged reaction period for the conversion of the diethylene glycol and the alkylamine to reasonable quantity of N-alkylmorpholine. However, these lower temperatures may be used and in its broadest aspect the reaction of the present invention may be conducted over a temperature range from about 140° C. to about 275° C. It should be noted, however, that at temperatures above about 250° C. the reaction tends to produce high boiling residues with a corresponding loss of the desired product.

It has also been discovered in another aspect of this invention that the reaction between the diethylene glycol and alkylamines is promoted by commercially available hydrogenation catalysts such as copper-chromium, platinum, palladium or nickel catalyst, and the equivalents thereof well known in the art. Suitable nickel catalysts in this regard comprise Girdler's G–49A and G–69 (trademark) and Harshaw's 0104P and Ni–XL–649–83P (trademark). It has been found that an especially suitable catalyst for the present invention comprises Girdler G–69, a 50% nickel on Kieselguhr promoted by 2% zirconium. The use of the reaction promoting hydrogenation type catalyst is preferred in order to improve reaction rates and yields of N-alkylmorpholine. The amount of catalyst that may be added is readily determined by a person having ordinary skill in the art.

In yet another aspect of the present invention it has also been discovered that the reaction of diethylene glycol with an alkylamine, dialkylamine or trialkylamine may be conducted in the presence or in the absence of a hydrogen atmosphere. It is preferred, however, to employ the hydrogen atmosphere since it has been observed that the better results are obtained. In the preferred embodiment, hydrogen is added to the reaction to produce an additional hydrogen pressure in the reaction system of from about 200 to about 1500 p.s.i.g., preferably from about 500 to about 1200 p.s.i.g. It is believed that the presence of hydrogen is desirable in order to maintain the nickel catalysts at a high level of activity.

Although the inventor does not wish to be limited by any theory it is believed that the reaction mechanism proceeds as follows when promoted by a hydrogenation catalyst such as nickel:

(I)  

(II)  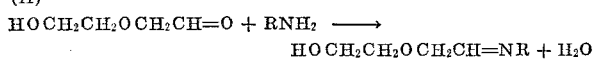

(III)  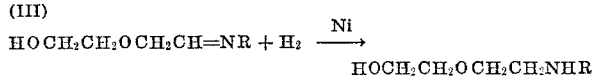

(IV)  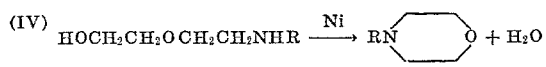

This scheme suggests that the first step of the reaction is a dehydrogenation-addition-hydrogenation sequence in which diethylene glycol and the alkylamine are converted to an intermediate 2(2'-alkylaminoethoxy)ethanol. The intermediate would then cyclize to N-alkylmorpholine by a dehydrogenation-addition-hydrogenation sequence similar to that by which it was formed. Formation of the cyclic compound, however, would not ordinarily be expected on the basis of U.S. Pat. 3,154,544.

Dialkylamines also would not be expected to form N-alkylmorpholine via this reaction scheme because the intermediate initially produced 2(2'-dialkylaminoethoxy)ethanol, is a tertiary amine, and as such would not be expected to participate in a dehydration-addition-hydrogenation sequence. Consequently, the reaction of diethylene glycol with diethylamine would be expected to give bis(2-diethylaminoethyl)ether rather than N-ethylmorpholine. Similarly, triethylamine, a tertiary amine, would not be expected to react with diethylene glycol. It has been discovered, however, that according to the present invention that alkyl, dialkyl or trialkyl amines may be used for the preparation of N-alkylmorpholines.

The reaction may be conducted in a batch or a continuous tubular reactor although batch operation is generally preferred, employing an autoclave and elevated pressures.

The following non-limiting examples are included as certain embodiments of the invention:

EXAMPLE I

Diethylene glycol (485 cc., 542 g., 5.1 moles); diethylamine (800 cc., 565 g., 7.75 moles); water, 100 g. and 40 g. of Harshaw Ni–XL–649–83P catalyst are charged to a three-liter stirred autoclave. Hydrogen is added to the system to a pressure of 250 p.s.i.g. The mixture is heated to 225° C. and maintained at this temperature for 6.5 hours. Highest reactor pressure achieved during the process is 1150 p.s.i.g.

After cooling, the autoclave is discharged and the crude reactor product was filtered to remove the suspended catalyst. The filtrate is distilled through a 15 plate, packed column and 510 g. of material boiling over the range 92–140° C. at 760 mm. is obtained. This mixture is dehydrated by treating it with an equal volume of aqueous 50 percent sodium hydroxide. The organic fraction is separated and redistilled through a 36 inch, spinning-band column which yields 250 g. of N-ethylmorpholine, boiling point 130–137° C. having a total alkalinity of 8.54 meq./g.; theoretical total alkalinity for N-ethylmorpholine, 8.69 meq./g.

The yield of N-ethylmorpholine based on diethylene glycol is 42.5 percent.

In addition, 70 g. of an intermediate amine boiling range 82–100° C./5 mm., 75 g. unreacted diethylene glycol and 42 g. of higher boiling residue are produced by this reaction.

EXAMPLE II

Diethylene glycol (425 ml., 475 g. 4.46 moles); 100 g. of water; diethylamine (1000 ml., 708 g. 9.7 moles) and 20 g. of Girdler G–69 catalyst are charged to a three-liter stirred autoclave. Hydrogen is added to the system to a pressure of 250 p.s.i.g. The mixture is heated to 225° C., and hydrogen is added to bring the total pressure to 1200 p.s.i.g. The reaction is maintained at 225° C. during which time the pressure remains at 1200 p.s.i.g.

After cooling, the autoclave is discharged to give 1255 g. of recovered material. The crude reactor product is filtered to remove the suspended catalyst. The product obtained (1178 g.) is then distilled through a 15-plate, packed column giving the fractions reported in Table I.

TABLE I

| Fraction: | Pressure, mm. Hg | Reflux ratio | Head temp., ° C. | Kettle temp., ° C. | Weight, g. |
|---|---|---|---|---|---|
| 1 | 760 | 5/1 | 61–70 | 77–84 | 195 |
| 2 | 760 | 5/1 | 70–78 | 84–97 | 255 |
| 3 | 760 | 5/1 | 78–94 | 97–97 | 60 |
| 4 | 760 | 3/1 | 94–96 | 97–190 | 386 |
| 5 | 760 | 3/1 | 96–137 | 190–210 | 88 |
| 6 | 150 | 3/1 | 92–150 | 198–240 | 34 |
| 7 | 150 | 3/1 | 150–170 | 240 | 21 |
| Residue | | | | | 66 |
| Total | | | | | 1,105 |

Fractions 3, 4, and 5 reported in Table I are combined and treated with an equal volume of 50 percent aqueous sodium hydroxide. The organic phase which separates is removed and dried over 50 g. of anhydrous sodium carbonate. The total amount of crude N-ethylmorpholine obtained is 387 g. Distillation of the crude material through a 36 inch laboratory spinning-band column gives 315 g. of N-ethylmorpholine, B.P. 135–137° C., which has a total alkalinity of 8.64 meq./g. Theoretical total total alkalinity for N-ethylmorpholine, 8.69 meq./g.

The yield of N-ethylmorpholine based on diethylene glycol is 61.5 percent.

EXAMPLE III

Diethylene glycol (485 cc., 542 g., 5.1 moles); diethylamine (800 cc., 565 g. 7.75 moles); water, 100 g. and 20 g. of Harshaw Ni–XL–649–83P catalyst are charged to a three-liter stirred autoclave. The procdure of Example I is followed and N-ethylmorpholine, boiling point 131–138° C., 256 g. corresponding to a 43.5 percent yield based on diethylene glycol; an intermediate amine, 113 g.; presumably 2(2'-diethylaminoethoxy)ethanol, 113 g.; unreacted diethylene glycol, 30 g.; and a high boiling residue, 92 g. are obtained.

EXAMPLE IV

Diethylene glycol (522 cc., 583 g., 5.5 moles), diethylamine (860 cc., 608 g., 8.35 moles) and 25 g. Harshaw Ni–XL–649–83P are charged to a three-liter stirred autoclave. The procedure of Example I is followed and a crude N-ethylmorpholine fraction of 235 g. is obtained after dehydration of the N-ethylmorpholine-water azeotrope with 50 percent aqueous sodium hydroxide.

Also obtained are 220 g. of the intermediate amine, 2-(2'-diethylaminoethoxy)ethanol boiling point 160–165/150 mm., and 65 g. of higher boiling residue.

EXAMPLE V

Triethylamino (1370 cc., 1000 g., 10 moles); diethylene glycol (240 cc., 268 g., 2.52 moles) and 20 g. of Harshaw Ni–XL–649–83P catalyst are charged to a three-liter stirred autoclave. Hydrogen is added to 250 p.s.i.g., the mixture heated to 225° C. and the final pressure of the reactor adjusted to 1200 p.s.i.g. with hydrogen.

After a six-hour reaction period, the reaction mixture is sampled and analyzed by gas chromatography which indicates very little N-ethylmorpholine in the crude product; the main components present, in addition to triethylamine and unreacted diethylene glycol, is 2(2'-diethylaminoethoxy)ethanol.

The reaction is continued, for an additional eight hours at 225° C. and after cooling, the crude product is filtered to remove suspended catalyst. Distillation of the filtrate through a 15-plate column removes the excess triethylamine and yields the following fractions: crude N-ethylmorpholine boiling point range 94–138° C., 130 g.; 2(2'-diethylaminoethoxy)ethanol, boiling point 160–167/150 mm., 105 g.; higher boiling residue 44 g.

The crude N-ethylmorpholine fraction is dried by treatment with aqueous 50 percent sodium hydroxide, giving 69 g. of good quality product, boiling point 130–135° C. upon redistillation through the 36 inch spinning-band column. The yield of N-ethylmorpholine based on diethylene glycol is 23.4 percent.

EXAMPLE VI

Diethylene glycol (485 cc., 542 g. 5.1 moles); ethylamine (740 cc. of 70 percent aqueous solution, 446 g. contained ethylene, 9.9 moles) and 20 g. Harshaw Ni–XL–649–83P catalyst are charged to a three-liter stirred autoclave. Hydrogen is added to the system to a pressure of 250 p.s.i.g. and the reaction mixture is heated to 250° C. This temperature is maintained for six hours during which time the pressure increases from 1210 p.s.i.g. to 1500 p.s.i.g.

The crude reaction product is distilled through a 15-plate, packed column and gives 580 g. of N-ethylmorpholine-water azeotrope boiling over the range 90–102° C., which when treated with an equal volume of aqueous 50 percent caustic gives 289 g. of crude N-ethylmorpholine.

The crude N-ethylmorpholine is combined with the residue from the initial distillation. Redistillation through a 36 inch, spinning-band column gives 235 g. of N-ethylmorpholine and 118 g. of high boiling residues. Yield of N-ethylmorpholine based on diethylane glycol is 40 percent.

EXAMPLE VII

Diethylene glycol (425 ml., 475 g., 4.46 moles); water 100 g. and 20 g. Girdler G–69 catalyst are charged to a three-liter autoclave. Dimethylamine (450 g., 10 moles) is then added to the autoclave as a liquid under nitrogen pressure. Hydrogen is introduced to the system to bring the total pressure to 250 p.s.i.g. and the reaction mixture is heated to 225° C. Additional hydrogen is added to adjust the pressure to 1200 p.s.i.g. and the system is maintained at 225° C. for 6 hours.

After discharging the autoclave and removing the catalyst, the crude product is distilled through a 15-plate packed column to give 375 g. of crude N-methylmorpholine. Dehydration of this material is achieved by treating it with an equal volume of 50 percent aqueous sodium hydroxide. The organic fraction is separated and distilled through a 36 inch spinning-band column to give 275 g. of N-methylmorpholine, boiling point 112–116° C. The yield of N-methylmorpholine based on diethylene glycol is 62 percent.

When the previously mentioned alkylamines, as well as those used in the foregoing examples, are employed according to the conditions of Example I as well as the conditions noted in the specification, substantially the same results are obtained.

Although the invention has been described by reference to certain embodiments it is not intended that the novel method of reacting diethylene glycol and alkylamines to produce N-alkylmorpholines be limited thereby but that certain modifications are intended to be included with the spirit and the broad scope of the following claims:

What is claimed is:

1. A method for the manufacture of N-alkylmorpholines, where said alkyl group has from 1 to 5 carbon atoms, comprising reacting in the presence of a hydrogenation catalyst, diethylene glycol and an alkylamine of the formula $R_1R_2R_3N$ where $R_1$, $R_2$, and $R_3$ are hydrogen or a 1 to 5 carbon atom alkyl group and at least one of the members $R_1$, $R_2$ and $R_3$ is a 1 to 5 carbon atom alkyl group.

2. The method of claim 1 wherein said catalyst comprises a nickel hydrogenation catalyst.

3. The method of claim 1 where said reaction is conducted in the presence of hydrogen.

4. The method of claim 3 where said hydrogen is at a pressure from about 200 to about 1500 p.s.i.g.

5. The method of claim 1 where said reaction is conducted at a temperature of from about 200° to about 275° C.

6. The method of claim 1 where said reaction is conducted in the presence of water.

7. The method of claim 6 where said water comprises from about 1 to about 100 parts by weight per 475 parts by weight of said diethylene glycol.

8. The method of claim 1 where said alkylamine is diethylamine and said N-alkylmorpholine is N-ethylmorpholine.

9. The method of claim 1 where said alkylamine is triethylamine and said N-alkylmorpholine is N-ethylmorpholine.

10. The method of claim 1 where said alkylamine is ethylamine and said N-alkylmorpholine is N-ethylmorpholine.

11. The method of claim 1 where said alkylamine is dimethylamine and said N-alkylmorpholine is N-methylmorpholine.

12. The method of claim 1 for the manufacture of N-alkylmorpholines comprising reacting diethylene glycol and said alkylamine in the presence of a nickel hydrogenation catalyst, from 0 to about 100 parts by weight of water per every 475 parts by weight of diethylene glycol, and hydrogen at from about 200 to about 1500 p.s.i.g. at a temperature from about 200 to about 275° C.

13. The method of claim 12 where said alkylamine is diethylamine and said N-alkylmorpholine is N-ethylmorpholine.

14. The method of claim 12 where said alkylamine is triethylamine and said N-alkylmorpholine is N-ethylmorpholine.

15. The method of claim 12 where said alkylamine is ethylamine and said N-alkylmorpholine is N-ethylmorpholine.

16. The method of claim 12 where said alkylamine is dimethylamine and said N-alkylmorpholine is N-methylmorpholine.

17. The process of claim 1 wherein said alkylamine is a dialkylamine.

18. The process of claim 12 wherein said alkylamine is a dialkylamine.

No references cited.

ALEX MAZEL, Primary Examiner

J. TOVAR, Assistant Examiner